Jan. 1, 1963 E. T. CLINTON ET AL 3,070,828
REMOVABLE CASTER LOCK
Filed Aug. 10, 1960 2 Sheets-Sheet 1

INVENTORS
EDWIN T. CLINTON
MICHAEL KRAMCSAK JR.

BY  A. G. Durak
ATTORNEY

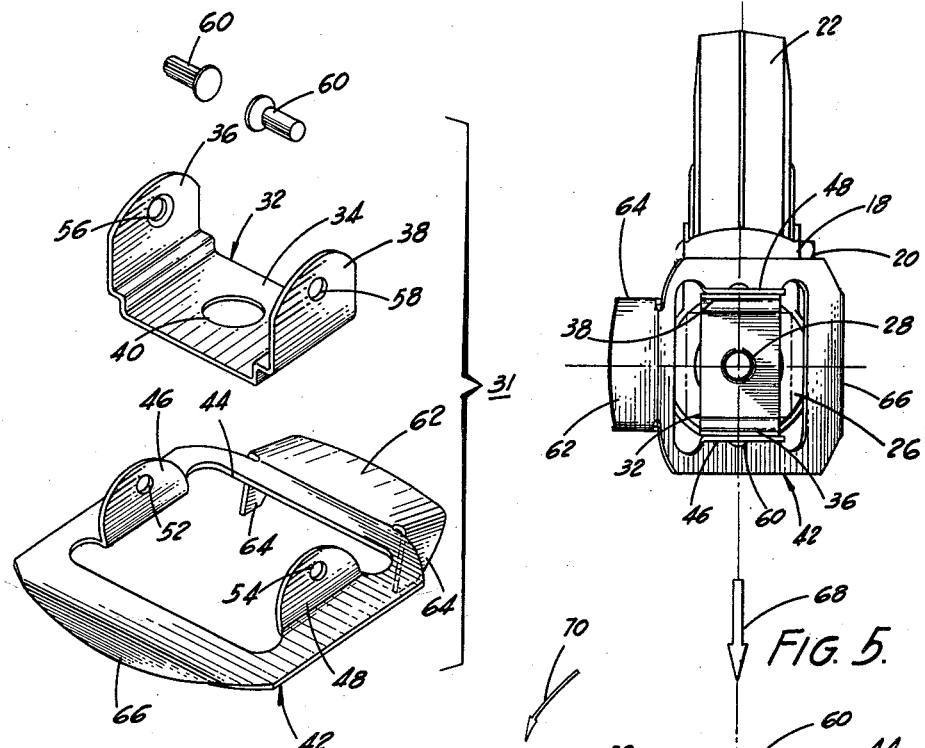
FIG. 4.
FIG. 5.
FIG. 3.
INVENTORS
EDWIN T. CLINTON
MICHAEL KRAMCSAK JR.
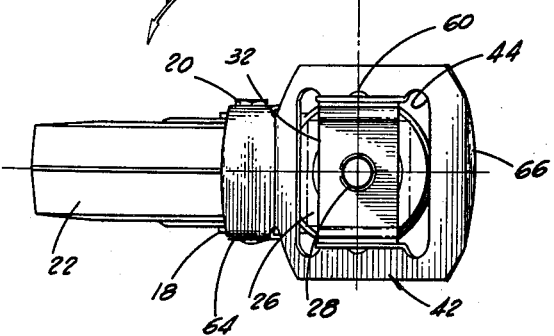
By

United States Patent Office 3,070,828
Patented Jan. 1, 1963

3,070,828
REMOVABLE CASTER LOCK
Edwin T. Clinton, Redding Ridge, and Michael Kramcsak, Jr., Bridgeport, Conn., assignors to The Bassick Company, Bridgeport, Conn., a corporation of Connecticut
Filed Aug. 10, 1960, Ser. No. 48,614
5 Claims. (Cl. 16—35)

This invention relates to caster locks for caster structures of the revoluble type and more particularly to an improved, greatly simplified caster lock which is readily removable from the caster itself.

Revoluble casters have been long used in supporting articles of furniture or the like for easy movement from one position to another in which the caster horn, holding the rotatably mounted caster wheel, is pivoted on an anti-friction bearing arrangement around a vertical axis enabling the article of furniture or the like to be propelled and maneuvered over the supporting surface. In many cases, an article on which casters are employed is required to remain for indefinite periods of time at a fixed position. It is sometimes extremely difficult to insure that the article will remain in its intended, fixed position, since the caster wheels are freely revoluble and will therefore align the caster wheel in a direction dependent upon the slope of the floor or other supporting surface with the final result that the article of furniture will move under the influence of gravity away from the desired position. In order to prevent such movement, it is desirable to rotate the caster about its vertical axis to a position where one of the caster wheels is at right angles to the direction of movement that the article would take under the normal influence of gravity and completely horizontal supporting surface to brake the article so supported. Various types of locking means have been employed in the past with caster structures for achieving this desired result. However, the locking means are, in most cases, relatively complex, and normally are formed integrally with the caster structure, thus failing to provide adequate locking means for casters presently in existence without such locking features.

It is therefore the principal object of this invention to provide an improved caster lock for a revoluble caster structure in which the caster lock is readily removable from the caster, allowing it to be employed with caster structures presently in existence and not provided with locking means.

It is a further object of this invention to provide an improved removable caster lock for use with standard caster structures which is universal in application and adapted to fit all standard caster structures employing standard mounting arrangements.

It is a further object of this invention to provide an improved removable caster lock for use with standard caster structures in which the lock is of greatly simplified construction.

It is a further object of this invention to provide an improved removable caster lock for use with standard caster structures which makes use of a positive locking action.

Other objects of this invention will be pointed out in the following detailed description and claims, and illustrated in the accompanying drawings which disclose by way of example, the principle of this invention and the best mode which has been contemplated of applying that principle.

In the drawings:

FIG. 3 is an exploded view of the components of the removable caster lock forming the present invention;

FIG. 4 is a top plan view of the removable caster lock positioned on a standard caster with the caster lock in the unlocked position and showing the direction of travel of the caster wheel;

FIG. 5 is a top plan view of the structure shown in FIG. 4 with the caster wheel pivoted 90 degrees to the direction of movement, the caster wheel being locked in this position.

Figure 2:
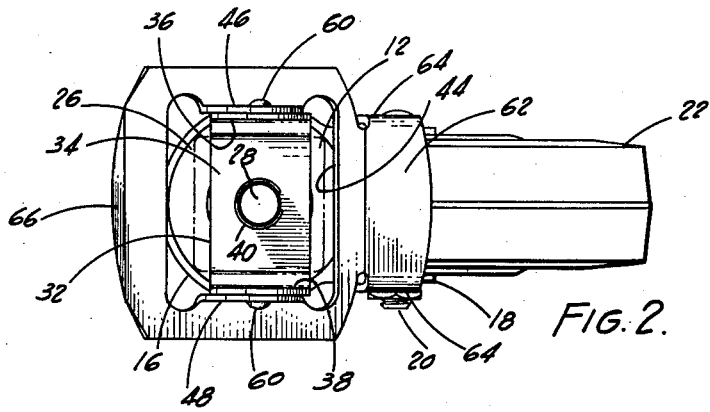
FIG. 2 is a top plan view of the apparatus shown in FIG. 1.

In general, the apparatus of this invention comprises a removable caster lock for use with a caster of the type including a caster horn, with a wheel rotatably mounted within said horn about a horizontal axis. Means are provided for mounting the horn and wheel assembly for rotation about a vertical axis on a pintle, with the pintle adapted to be inserted and rigidly held within the leg of an article to be supported on the caster. The horn further includes a longitudinally projecting portion which partially encloses the rotatably mounted wheel. A caster lock including a caster lock support member is removably mounted on the pintle between the pintle and the leg with means formed on the caster lock support member for preventing rotation around the pintle. A locking plate is pivotally mounted on the caster lock support member and is adapted to pivot downwarly into the path of movement of the rotatable caster horn and means are provided on the pivotable plate which cooperate with the caster horn projecting portion for locking the caster horn against rotation about the vertical axis when the locking plate is moved to its extreme downward position.

Referring to the drawings, there is shown a conventional caster structure including a horn member 10 having a generally flattened top portion 12 and a pair of downwardly directed, spaced, generally parallel sides 14, the forward portion 16 of the horn 10 is curved and is generally semi-cylindrical in configuration, while the rear portions of the sides 14 are flattened to provide a rearward projecting portion 18. At the lower end of the sides 14, there is provided a pair of aligned apertures which act to receive a transverse axle 20 which supports a caster wheel 22 for rotation about a generally horizontal axis within the horn.

The caster structure further includes an anti-friction bearing which is indicated generally at 24 of conventional construction positioned between the horn top portion 12 and a disc-shaped caster support member 26 which has a pintle 28 rigidly attached thereto. The anti-friction bearing 24 therefore allows the horn 10 to rotate with respect to the support plate 26 about a generally vertical axis.

The present invention is directed to a greatly simplified arrangement for achieving a braking or locking action of the caster wheel by preventing rotation of the caster horn with respect to the mounting plate about the vertical axis of the pintle. In this regard, it should be noted that in mounting the caster structure on a leg of furniture or other device which the caster acts to support, means are provided for frictionally engaging the pintle member 28 to the leg 30 of the article indicated by the dotted line portion of FIG. 1. Under normal circumstances, the leg 30 extends downwardly and is normally positioned in contact with the support member 26. In the present case, there is provided a removable caster lock in which the caster lock is provided with means for mounting the lock on the pintle 28 between the support plate 26 and the terminal portion of the leg 30. In such a position, the caster lock may be easily removed or positioned on the caster structure just prior to engaging the pintle with the retaining means within leg 30. Referring now to FIG. 3, the simplified removable caster lock 31 includes a generally U-shaped caster lock support member 32 having a generally flattened base portion 34 and a pair of upstanding legs 36 and 38, the caster lock support member 32 being formed of sheet metal or the like. In order to allow the caster lock to be removably positioned upon the caster structure proper, there is provided an aperture 40 which is located centrally of the base portion 34 of the structure, and is of a diameter slightly in excess of the diameter of the pintle 28 of the caster structure. Of course, the diameter of the aperture 40 will vary with the size of the caster with which the caster lock is to be used, the only requirement being that the aperture be somewhat in excess of the diameter of the pintle with which the caster lock support member 32 is adapted to be positioned on the pintle 28 intermediate of the article leg 30 and the upper surface of support member 26.

In order to prevent relative rotation of the caster lock support member 32 with respect to the pintle and the support plate 26, the upstanding legs 36 and 38 of the U-shaped member act to embrace the leg 30 preventing rotation of the caster lock support member 32 around the leg. While in this case, the flattened sides of the caster lock support member and the flattened sides of the leg 30 cooperate, it is readily apparent that any desirable configuration may be given to the U-shaped caster lock support member to prevent such rotation, and it is contemplated that other means may readily be provided for preventing relative rotation between these members. For example, in the case of a circular leg, the upstanding legs 36 and 38 of the caster lock support member could have curved faces provided with friction means for engaging the surface of the article leg and preventing rotation of the lock thereabout.

The second of the two major components of the simplified removable caster lock of the present invention is a generally flattened caster lock plate member 42 which is generally rectangular and includes a large, generally square opening 44 formed in the center of the plate, the opening having lateral dimensions somewhat greater than the width of the U-shaped support member. There is further provided a pair of upstanding lug members 46 and 48 positioned on either side of the plate member adjacent the opening 44 with the lugs being formed integrally of the sheet metal plate member. The lugs 46 and 48 include a pair of aligned apertures 52 and 54 respectively, which are adapted to cooperate with a like pair of aligned apertures 56 and 58 formed within the legs 36 and 38 respectively of the U-shaped support member for providing a pivotable connection between these two members. The support member 32 is positioned within aperture 44 with the apertures 52, 54, 56 and 58 in alignment and a pair of rivets 60 are inserted within the aligned apertures to provide a pivotable mounting arrangement for the two elements allowing the plate member to pivot about a generally horizontal axis with respect to the caster lock support member 32. This transverse pivotal axis extends at right angles to the pintle and passes generally through the axis of the pintle.

To achieve a positive locking function, the plate member 42 is provided with an elongated rear portion 62 which is formed integrally of this member, the rear portion 62 further including a pair of depending tabs 64 formed on either side thereof extending below the horizontal plane of the plate member proper and being spaced a distance slightly in excess of the width of horn member 10, at the rear extension portion 18, allowing the tabs to embrace the horn sides 14. The plate member 42 also includes a downwardly directed flange portion 66 at the forward or leading edge of the plate, flange portion 66 having a curved and somewhat semi-circular configuration.

Figure 1:
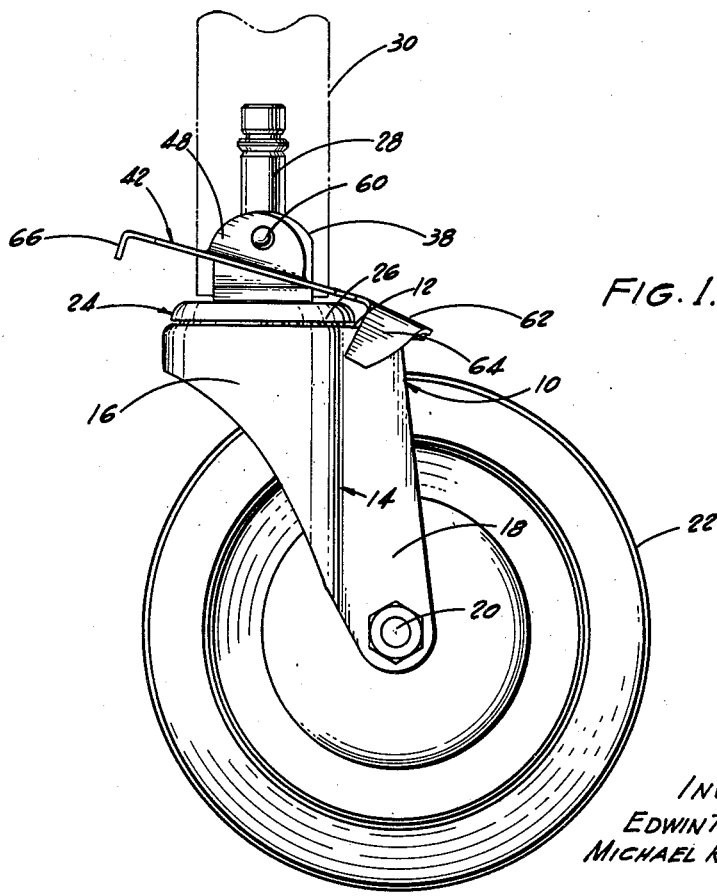
FIG. 1 is a side elevational view of a conventional caster structure employing the apparatus of the present invention.

Referring to FIGS. 1 and 2, it can be seen that the caster lock assembly is positioned on the pintle 28 with the bottom surface of the U-shaped support member 32 contacting the upper surface of the caster supporting plate 26, and pintle 28 is inserted within the leg 30. The leg portions 36 and 38 of the support members 32 embrace the furniture leg 30 preventing relative rotation of the caster lock with respect to the pintle and the furniture leg. At the same time, the locking plate 42 occupies a generally horizontal position with the pivotal connection at 60 allowing limited movement of the plate member around the axis provided by rivets 60. In the position indicated in FIG. 1, the rear portion 62 of the locking plate has been moved downwardly toward the caster horn 10 and is in such a position that the depending tabs 64 of this portion of the plate act to embrace the generally flattened parallel side portions 18 of the caster horn 10. It is readily apparent that rotation of the caster horn with respect to the pintle and the furniture leg 30 is thus effectively prevented and positive locking is achieved.

In order to release the locking plate 42, it is only necessary to exert a downward force on the forward or leading edge 66 of the locking plate causing counter-clockwise rotation of this member about the rivets 60, causing the locking tabs 64 to move upwardly out of the path of rotative movement of the horn member 10 about the axis of pintle 28. While in the present embodiment, counter-clockwise rotation of plate 42 about its axis 60 is limited by contact of the bottom portion of the locking plate 42 forward of the pivot pin 60 with the support plate 26 of the caster, it is apparent that the leading edge or extension 66 of plate 42 could be so formed as to allow this portion of the member to act as a means for limiting the rotative movement of the plate member 42 about the pin 60.

The operation of the simplified, removable caster lock may be best seen by reference to FIGS. 4 and 5 of the drawings. FIG. 4 shows the position of the caster lock on the caster structure with the axis of the caster lock being generally at right angles to the direction of movement of the caster wheel indicated by arrow 68 and the position occupied when the caster lock is in its inoperative position. In this position any downward pivotal movement of the locking plate will merely result in contact of the locking tabs 64 with the cylindrical portion 16 of the caster horn 10, in which case, there is no resistance to rotational movement of the caster about the axis of the pintle 28. With plate 42 in a substantially horizontal position, the caster may rotate freely throughout a full 360 degrees, with the locking tabs removed from the path of movement of portions 18 of the horn portion. However, in the position indicated in FIG. 5, the longitudinal axis of the caster conforms to the longitudinal axis of the caster lock, and an upward movement of edge 66 of the caster locking plate 42 lowers the locking tabs 64 so that they embrace portions 18 of the horn and effectively prevent rotation of the caster around the axis of the pintle 28.

In most instances, it is necessary only to lock one of the caster wheels to prevent an article of furniture or the like from rolling. Assuming, than an article of furniture, such as a hospital bed, is provided with conventional casters on all four legs, it would only be necessary to provide a removable caster lock on one of the legs. Movement of the caster wheel is indicated in FIG. 4 to a position as indicated in FIG. 5 by rotation in the direction indicated by arrow 70 for a full 90 degrees and at right angles to the direction of motion permitted by the remaining free wheels and subsequent locking prevents further rolling of the bed.

It is apparent that modifications of the present invention can be made without departing from the scope of the present invention. For example, a single depending tab is envisioned to act with a notch located in the horn whereby the single tab would merely engage the notch to achieve a positive locking operation. As mentioned previously, any desired configuration may be given to the upstanding leg portions of the caster lock support plate to prevent rotation of the caster lock with respect to the pintle and the article to which it is attached. The improved structure is comparatively simple and may be manufactured at relatively low cost. The device operates very satisfactorily in service, being adapted by convenient manipulation to exert a positive and effective braking pressure over as along a period as desired. It is only necessary that the relative size of the components be such, that the removable lock may be inserted readily upon the pintle of the existing caster structure and that the distance between the depending locking tabs be somewhat greater than the width of the caster horn at that point.

While there have been described and illustrated the fundamental novel features of the invention as applied to a preferred embodiment, it will be understood that various omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. A caster lock for a caster of the type normally used to support an article of furniture including a horn, a wheel rotatably mounted within said horn, said horn including a projecting portion partially enclosing the rotatably mounted wheel, a pintle, means for mounting said horn and wheel assembly on said pintle for rotation about a vertical axis, said pintle adapted to be inserted into the leg of an article to be supported on said caster, said caster lock comprising; a generally U-shaped supporting member have a base with an opening therein adapted to receive the pintle of said caster and having spaced legs adapted to engage opposite sides of the article leg for preventing rotation of said U-shaped supporting member when assembled on said caster, a plate member having an opening therein adapted to receive the article leg, upstanding lugs intermediate the ends of said plate member aligned at opposite edges of said opening and engaging the spaced legs of the supporting member, means for connecting said lugs to said spaced legs whereby said plate member is adapted to pivot intermediate its ends about an axis substantially transverse to the axis of said pintle, a pair of depending members on one end of the plate member, said depending members being spaced apart a distance sufficient to straddle said caster horn when said one end of the plate member is pivoted downwardly to thereby lock the caster horn against rotational movement.

2. In combination, a caster and a removable caster lock to be mounted on the leg of an article of furniture or the like, said caster comprising a pintle, a horn member mounted for rotation about the axis of said pintle, means for axially securing said pintle to said article leg, a caster wheel rotatably mounted within said horn, said lock comprising a caster lock support member having an aperture therein for receiving said pintle, said caster lock support member being positioned on said pintle between said horn and said article leg, and having an upturned portion engaging the article leg for preventing rotation of the lock support member relative to said article leg, a locking plate, means for pivotally mounting said locking plate intermediate its ends on said caster lock support member at said upturned portion for allowing at least one of said ends to move downwardly toward said caster horn, and depending lug means formed on said one of the ends and adapted to cooperate with said caster horn when said locking plate is moved to the locking position to thereby prevent said caster horn from further rotation about the axis of said pintle.

3. A removable caster lock for use with a caster normally used to support an article of furniture including a caster horn having a caster wheel mounted for rotation therein, a pintle, means for rotatably supporting said caster horn on said pintle for rotation around the axis of said pintle, said removable caster lock comprising; a generally U-shaped supporting member including a pair of spaced, generally parallel upstanding legs and a base portion and having an aperture formed within the base portion of said member, said aperture adapted to receive said pintle, a flat, rectangular plate member having an opening formed therein adapted to receive said supporting member, a pair of upstanding lugs on said plate member aligned with each other on opposite sides of said opening, means for pivotally connecting said lugs and the legs of said U-shaped support member to allow rotation of said rectangular plate member about an axis transverse to the axis of said pintle, means for preventing rotation of said supporting member with respect to said pintle, and said plate member further including at least one stop portion adapted to engage said horn upon downward pivotal movement of said plate member to prevent rotation of said horn around said pintle.

4. For a caster including a horn, a wheel supported by the horn for rotation along a supporting surface about a first axis, and caster mounting structure on the horn operable to swivel the horn relative to a supported article about a second axis transverse to the first axis generally normal to the supporting surface, the improvement being a readily removable caster lock comprising, a support member having a base portion and a leg portion projecting therefrom, said base portion being adapted to fit between the mounting structure and the supported article and be non-rotatably locked to the article, an elongated locking member pivoted intermediate its ends to the leg portion of the support member to pivot about an axis transverse to said second axis, said locking member being elongated in its operative assembly with the caster in general parallel relationship with respect to the supporting surface, and means at one of the ends of the locking member engageable, in a locking position of the locking member, with a portion of the horn to prevent rotation thereof about said second axis, said means being spaced from said portion of the horn, in a second position of the locking member, to permit unrestricted rotation thereof about said second axis, said locking member being depressible at its ends, respectively, by forces toward the supporting surface to move the locking member into and from the locking position.

5. For a caster including a horn, a wheel supported by the horn for rotation about a first axis, and caster mounting structure on the horn operable to swivel the horn about a second axis transverse to the first axis, said mounting structure including a support plate adapted to be fixed relative to a supported article leg, the improvement being a readily removable caster lock, comprising a support member having a base portion and spaced leg portions projecting therefrom, said base portion being adapted to fit between the support plate and the supported leg with the leg portions engaging the supported leg to prevent relative rotation thereof, a locking plate having an intermediate opening larger than the supported leg adapted to receive the supported leg, said locking plate having upstanding lugs aligned intermediate its ends on opposite sides of the opening and spaced to engage the leg portions of the support member, means pivotally interconnecting the support member and the locking plate at the leg portions and lugs, tabs depending from one end of the locking member and spaced apart to straddle the horn closely adjacent thereto, said locking plate being depressible at its opposite ends respectively, to move the tabs into and from a locking position engageable with the horn operable to prevent rotation of said horn.

References Cited in the file of this patent

UNITED STATES PATENTS

| | | |
|---|---|---|
| 467,873 | Hughes | Jan. 26, 1892 |
| 2,728,936 | Hodges et al. | Jan. 3, 1956 |
| 2,799,514 | Kramcsak | July 16, 1957 |

FOREIGN PATENTS

| | | |
|---|---|---|
| 571,019 | Italy | Dec. 20, 1957 |